(12) United States Patent
McCarthy et al.

(10) Patent No.: US 8,469,369 B1
(45) Date of Patent: Jun. 25, 2013

(54) COMBINED SEAT WITH COMPRESSION DEVICE AND METHODS THEREOF

(75) Inventors: Thomas C. McCarthy, Warren, RI (US); Craig McElhaney, Bristol, RI (US); Steven Lee Unruh, Providence, RI (US)

(73) Assignee: Hasbro, Inc., Pawtucket, RI (US)

( * ) Notice: Subject to any disclaimer, the term of this patent is extended or adjusted under 35 U.S.C. 154(b) by 319 days.

(21) Appl. No.: 13/045,798

(22) Filed: Mar. 11, 2011

(51) Int. Cl.
*A63G 19/00* (2006.01)
*B62K 9/00* (2006.01)

(52) U.S. Cl.
USPC .............. 280/1.14; 280/1.183; 280/1.191; 280/1.23; 280/200; 280/210; 280/282; 280/220; 280/226.1; 472/95; 472/110; 472/135; 446/409; 446/410; 446/175

(58) Field of Classification Search
USPC .......... 280/1.14, 1.193, 1.191, 1.23, 210, 280/200, 220, 218, 226.1; 472/95, 110, 135; 446/409, 410, 175
See application file for complete search history.

(56) References Cited

U.S. PATENT DOCUMENTS

| | | | |
|---|---|---|---|
| 1,961,796 A | 6/1934 | Shuster | |
| 2,529,631 A * | 11/1950 | Ritter | 446/271 |
| 2,635,886 A * | 4/1953 | Schoebel | 280/1.183 |
| 2,802,671 A | 8/1957 | Skoggard | |
| 4,289,307 A | 9/1981 | Marshall, Jr. et al. | |
| 4,379,550 A | 4/1983 | Petersen | |
| 5,074,820 A | 12/1991 | Nakayama | |
| 5,816,885 A | 10/1998 | Goldman et al. | |
| D436,387 S * | 1/2001 | Pardi | D21/429 |
| 6,533,672 B1 * | 3/2003 | Keller et al. | 472/110 |
| 6,872,145 B1 | 3/2005 | Boudreaux et al. | |
| 7,572,190 B2 | 8/2009 | Habing | |
| 7,775,893 B2 | 8/2010 | Blumenthal | |
| 2009/0098520 A1 | 4/2009 | Wilson | |
| 2010/0270772 A1 * | 10/2010 | Webb et al. | 280/210 |
| 2010/0279782 A1 * | 11/2010 | Sonner et al. | 472/95 |

* cited by examiner

*Primary Examiner* — Tashiana Adams
*Assistant Examiner* — Marlon Arce
(74) *Attorney, Agent, or Firm* — Perry Hoffman

(57) ABSTRACT

A combined seat with compression device for interactively actuating a sound effects unit incorporated into a ride on toy vehicle as a user bounces up and down on the combined seat with compression device. The toy includes a frame for a ride-on toy vehicle, a sound effects unit having a housing secured to the frame, a seat secured to the frame and movable between first and second positions, an actuating mechanism attached at the seat for engagement with the sound effects unit, and a deformable compression device positioned at the seat capable of depressing as the seat is moved from the first the position to the second position to interactively activate the sound effects unit.

20 Claims, 4 Drawing Sheets

COMBINED SEAT WITH COMPRESSION DEVICE AND METHODS THEREOF

BACKGROUND OF THE INVENTION

1. Field of the Invention

The present invention relates to toys, and more particularly to a ride on toy vehicle with a combined seat and compression device for simply yet interactively actuating an incorporated sound effects unit when a user bounces up and down on the combined seat and compression device. The invention also relates to a method for engaging and actuating a sound effects unit in a ride on toy vehicle.

2. Background of the Invention

There are many known ride on toys which incorporate biasing elements for supporting and moving a seat member and some include sound devices to enhance the play experience of a user. Engaging the biasing elements and activating the sound devices can be accomplished through many known mechanisms, some of which are incorporated into the same toy, but none of which work to activate each other.

There are several known ride on toys which include a heavy duty spring, spring arch, or spring loaded hydraulic air piston secured to a seat member for raising and lowering the seat member in use, as exemplified and disclosed in U.S. Pat. No. 7,572,190 B2, issued Aug. 11, 2009 to Habling and U.S. Pat. No. 6,872,145 B1 issued Mar. 29, 2005 to Boudreaux et al. Most of the above described toys are known to be used in seesaw and seesaw like playground equipment. The seat member is pivotally attached to a frame and supported in a generally horizontal position by the heavy duty spring or hydraulic air piston, or similarly supported in a generally horizontal position by the spring arch. The user may bounce up and down on the seat as the frame of the toy is secured in a stationary position. However, the spring arch is known to include wheels mounted to an end opposite the seat for propelling the toy forward as the user bounces on the seat.

Another known ride on toy disclosed in U.S. Pat. No. 6,533,672 B1, issued Mar. 18, 2003 to Keller et al., simulates a seesaw is shown to include a biasing arm secured to a supporting base with a seat secured to the arm at an end opposite the supporting base. The arm is rotatably and pivotably coupled to the base and includes an arm biasing spring connected to the base to bias the arm to the upright position. A resilient ball is attached to the seat for contacting the ground surface as a user sits on the seat and swings around or bounces off the ground.

Another known ride on toy disclosed in US Patent Publication No. US 2009/0098520 A1, published Apr. 16, 2009 to Wilson, includes a training device used for teaching proper dressage riding postures and is also seen to include a resilient ball for contacting the ground surface and upon which a rider would sit. The ball is shaped to emulate the back of a horse and includes blocks attached to the surface of the ball where the user sits to emulate a dressage saddle for teaching the rider proper leg and arm flexion and extension for dressage style riding.

Another ride on toy disclosed in U.S. Pat. No. 4,289,307 issued Sep. 15, 1981 to Marchall, Jr. et al, is seen to include a toy horse suspended on a frame by springs secured on both left and right sides of the horse. The horse can move both vertically and horizontally with respect to the frame and includes a sound device for playing prerecorded horse sounds when bounced. Several motion sensitive switches are positioned within the toy horse and orientated in different directions for sensing the vertical and horizontal movements of the horse. Also included are devices for digitally forming audio frequency signals and controlling the envelope of the audio frequency signals to obtain and select the various prerecorded gait and snorting sounds which appropriately correspond to the present movement of the toy horse as a user bounces on the horse.

Additionally, a large mountable stuffed toy disclosed in U.S. Pat. No. 5,074,820 issued Dec. 24, 1991 to Nakayama, is seen to include a stuffed body shaped like a horse or car, etc. and containing a main switch secured to a sound/vibration generator disposed within. When a load is applied to the main switch the sound/vibrator is turned on to vibrate at least a part of the stuffed toy and to generate a sound. Additionally, remote switches are positioned in strategic parts of the stuffed toy, i.e. the horses reins, ears, and crop, etc, and electrical wiring corresponding to each remote switch runs from each switch to the sound/vibration unit to activate the remote switches when each is individually pressed from the outside of the toy, at the reins, ears, and crop, etc., for altering the vibrators vibration and the sounds generated.

Another deformable toy disclosed in U.S. Pat. No. 5,816,885, issued Oct. 6, 1998 to Goldman, et al., includes a sound device contained within a body and actuated when external pressure is applied to the body. A pressure transmitting medium fills the body and an actuator including a piezoelectric transducer and plunger within the body responds to pressure transmitted through the medium by deforming the body to shift the plunger, thus stressing the transducer to signal the toy circuitry for altering the sounds played back from the sound reproducing device of the toy.

Significantly, known toys do not include a combined seat and compression device which simply yet interactively actuates an incorporated sound effects unit when the seat is bounced up and down on by a user. It would be desirable to provide a seat movable between first and second positions combined with a deformable compression device biasing the seat to the first position and interactively activating the incorporated sound effects unit as the seat is moved from the first position to the second position when the compression device is depressed.

SUMMARY OF THE INVENTION

The present invention addresses shortcomings of the prior art to provide a ride on toy vehicle which simply yet interactively actuates an incorporated sound effects unit through a combined seat and deformable compression mechanism. A combined seat and deformable compression device activate the sound effects unit when a user bounces up and down on the seat.

In one embodiment of the invention, a ride on toy includes a frame for a ride-on toy vehicle, a sound effects unit having a housing secured to the frame, a seat affixed to traverse between first and second positions at the frame, and a deformable compression device biasing the seat to the first position and depressing as the seat is moved from the first the position to the second position. Further included is an actuating mechanism affixed at the seat to mechanically engage and activate the sound effects unit when the seat is in the second position In another embodiment of the invention, the compression device is made of an elastomeric material for repeatedly depressing enabling a user to bounce up and down on the seat and repeatedly activate the sound effects unit. In another embodiment, the compression device further includes an inflatable ball.

In another embodiment of the invention, the actuating mechanism further includes a cam secured at the seat for engaging and actuating the sound effects unit. In another embodiment the sound effects unit further includes a button switch at the housing and the cam engages and actuates the sound effects unit at the button switch.

In yet another embodiment, the toy further includes a pivoting mechanism secured at the seat at an end opposite the compression device forming a pivoting attachment between the seat and the frame. In another embodiment, the toy further includes one or more wheels rotatably secured to the frame. In still yet another embodiment, the toy further includes a kick stand secured to the frame for maintaining the toy in a stationary position, and in yet another embodiment the toy further includes a handle bar element.

In one embodiment of the invention, a method for interactively engaging and actuating a sound effects unit in a ride on toy vehicle, including the steps of providing a frame for a ride on toy vehicle, providing a sound effects unit having a housing secured to the frame, providing a seat affixed to traverse between first and second positions at the frame, providing a deformable compression device biasing the seat to the first position, and providing an actuating mechanism affixed at the seat for engagement with the sound effects unit. Driving the seat from the first position to the second position depresses the compression device and interactively activates the sound effects unit when the seat is in the second position.

In another embodiment of the invention, the sound effects unit further includes two or more pre-recorded sound tracks and further including the steps of repeatedly driving the seat to the second position depressing the compression device, and restoring the compression device to the biasing position to interactively change the pre-recorded sound tracks each time the seat is in the second position.

In another embodiment of the invention, the compression device further provides an elastomeric material for supporting the seat in the first position and depressing to allow the seat to be moved into the second position enabling a user to repeatedly bounce up and down on the seat. In yet another embodiment, the compression device further provides an inflatable ball.

In another embodiment, the actuating mechanism further provides a cam secured to the seat for engaging and actuating the sound effects unit. I yet another embodiment, the sound effects unit further provides a button switch at the housing and the cam engages and actuates the sound effects unit at the button switch.

In another embodiment of the invention, a ride on toy includes a frame for a ride-on toy vehicle, a sound effects unit having a housing secured to the frame and including two or more pre-recorded sound tracks, a seat affixed to traverse between first and second positions at the frame, and a deformable compression device affixed to depress and bounce back at the seat, depressing when the seat is in the second position. Further included is an actuating mechanism affixed at the seat in mechanical communication with the sound effects unit activating the unit and interactively changing the pre-recorded sound tracks each time the seat is in the second position.

In another embodiment of the invention, wherein the compression device further includes an elastomeric material for repeatedly depressing enabling a user to repeatedly bounce up and down on the seat and interactively activate the sound effects unit. In another embodiment the compression device further includes an inflatable ball.

In another embodiment, the actuating mechanism further includes a cam secured to the seat for engaging and actuating the sound effects unit. In yet another embodiment, the sound effects unit further includes a button switch at the housing and the cam engages and actuates the sound effects unit at the button switch.

BRIEF DESCRIPTION OF THE DRAWINGS

For the purpose of facilitating an understanding of the inventions, the accompanying drawings and description illustrate a preferred embodiment thereof, from which the inventions, structure, construction and operation, and many related advantages may be readily understood and appreciated.

FIG. 2A is a side view of an embodiment of the invention illustrating the compression device biasing the seat to a first position, while

For the purpose of facilitating an understanding of the inventions, the accompanying drawings and description illustrate a preferred embodiment thereof, from which the inventions, structure, construction and operation, and many related advantages may be readily understood and appreciated.

DESCRIPTION OF THE PREFERRED EMBODIMENTS

The following description is provided to enable those skilled in the art to make and use the described embodiments set forth in the best modes contemplated for carrying out the invention. Various modifications, however, will remain readily apparent to those skilled in the art. Any and all such modifications, equivalents, and alternatives are intended to fall within the spirit and scope to the present invention.

Figure 1:
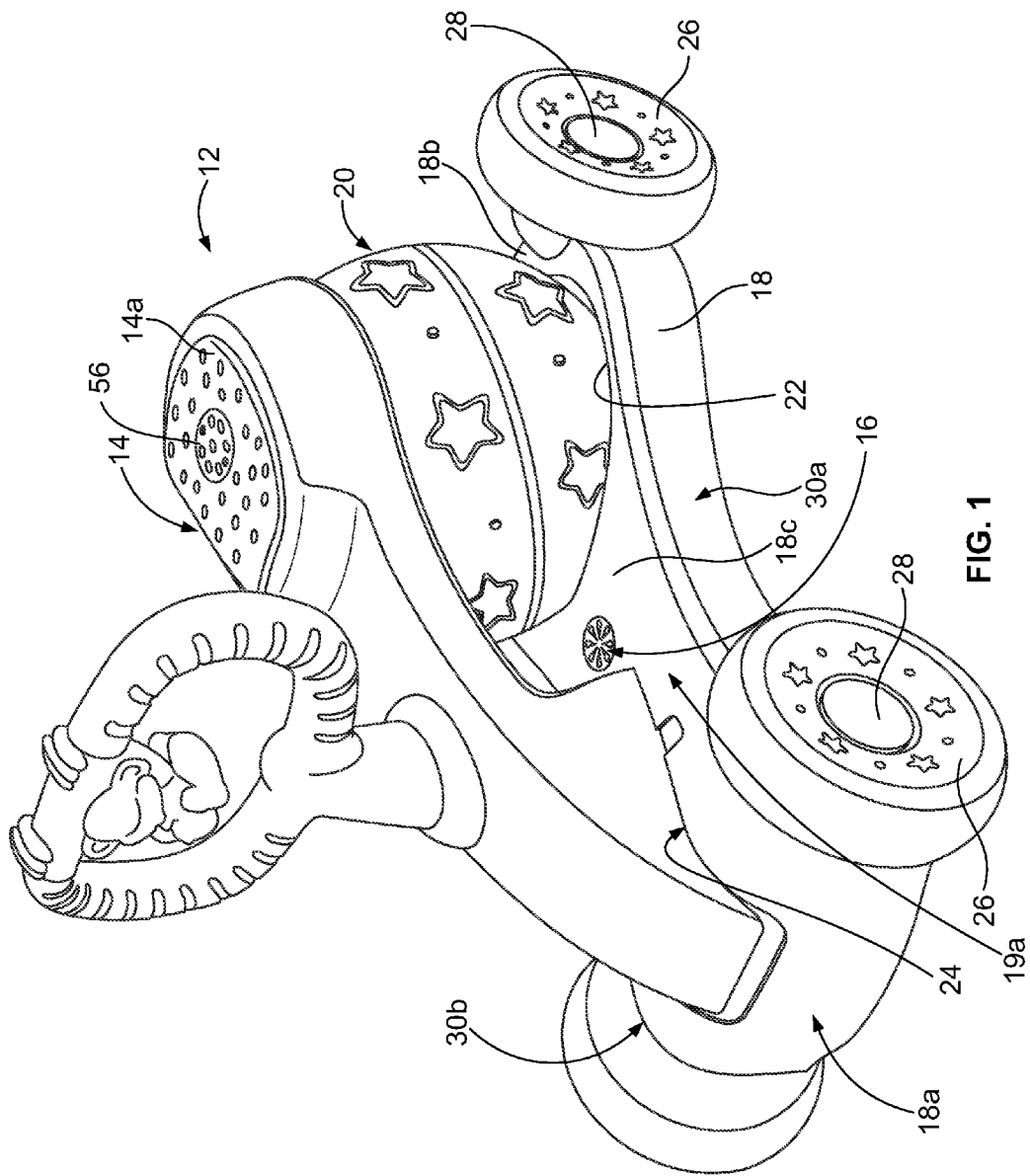
FIG. 1 is perspective view of a ride on toy vehicle of the present invention illustrating an incorporated combined seat with compression device.

A ride on toy vehicle 12, as seen in FIG. 1, is generally seen to include a combined seat with deformable compression device to simply yet interactively actuate an incorporated sound effects unit when a user bounces up and down on the seat. In the present described embodiment, as seen in FIG. 1, a seat 14 and a sound effects unit 16 are secured to a frame 18 for a ride on toy vehicle. A deformable compression device 20 is positioned at the seat and capable of depressing as the user bounces the seat up and down interactively actuating the sound effects unit 16.

The frame 18, generally seen in FIG. 1, as a single piece of molded heavy duty plastic shaped to provide support for the ride on vehicle 12. Heavy duty plastic is simple and inexpensive to mold into a desired shape and can easily include fun colors, however it is also contemplated that the frame can be made of other materials such as wood and metal, etc. The frame 18 further includes a scooped out concave portion 22 for securely resting the compression device 20 at the frame and a cut out portion 24 for allowing the secured seat 14 to at least partially pass through the frame 18 for engagement with the sound effects unit 16.

In the present described embodiment, the frame 18 is generally H shaped having a first end 18a and a second end 18b both horizontally wider than the middle portion 18c to accommodate one or more wheels 26 rotatably secured to the frame at end portions, 18a & 18b. The tapered middle portion 18c allows the user to comfortably sit on seat 14 and push the toy 12 along a surface without interfering with the one or more wheels 26 secured to the frame 18. In the present defined embodiment, end portions, 18a & 18b also include short axles 28 protruding from both sides 30a and 30b of the frame 18, to accommodate wheels 26 at each axle.

In the present described embodiment, the axles 28 are integral with frame 18 and generally molded along with frame 18, though separate securely attached axels are also contemplated. The axels 28 are positioned at the 4 corners of the ride on toy vehicle 12, as described above, and are sized to allow the wheels 26 to be easily pushed onto and secured to each axel without the need for any further securing elements such as pins or screws etc. The wheels 26 are plastic hollow wheels which can include fun colors, though rubber wheels are also contemplated, and are rotatably secured to each axel allowing the wheels to turn freely when the ride on toy 12 is pushed along the surface.

Figure 2A:
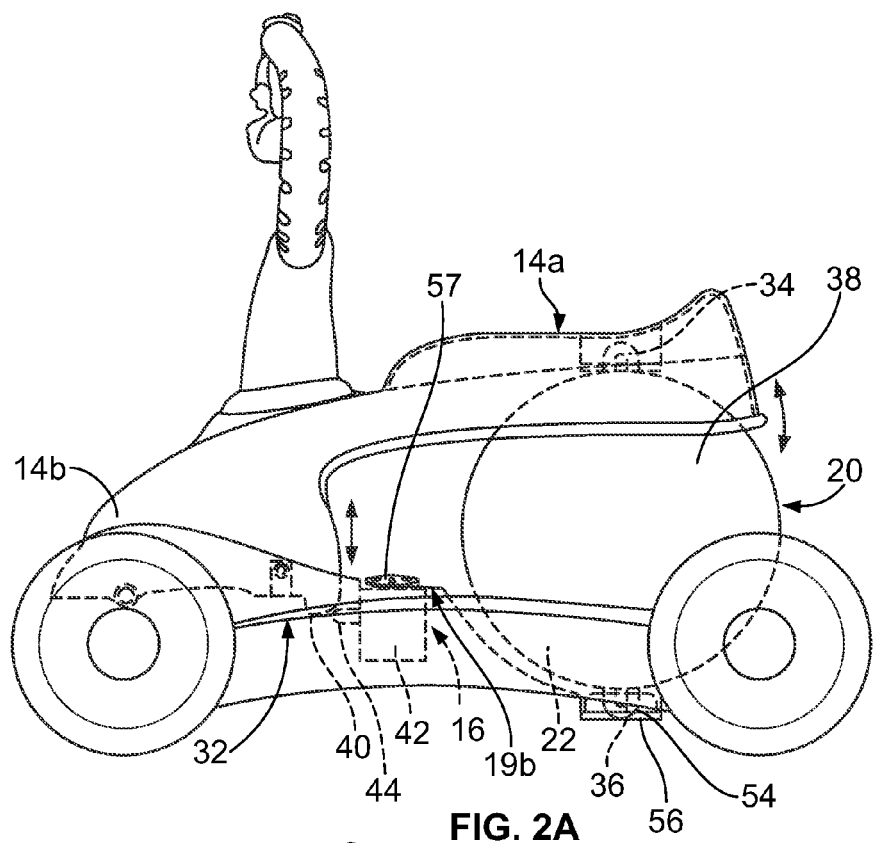
Figure 2B:
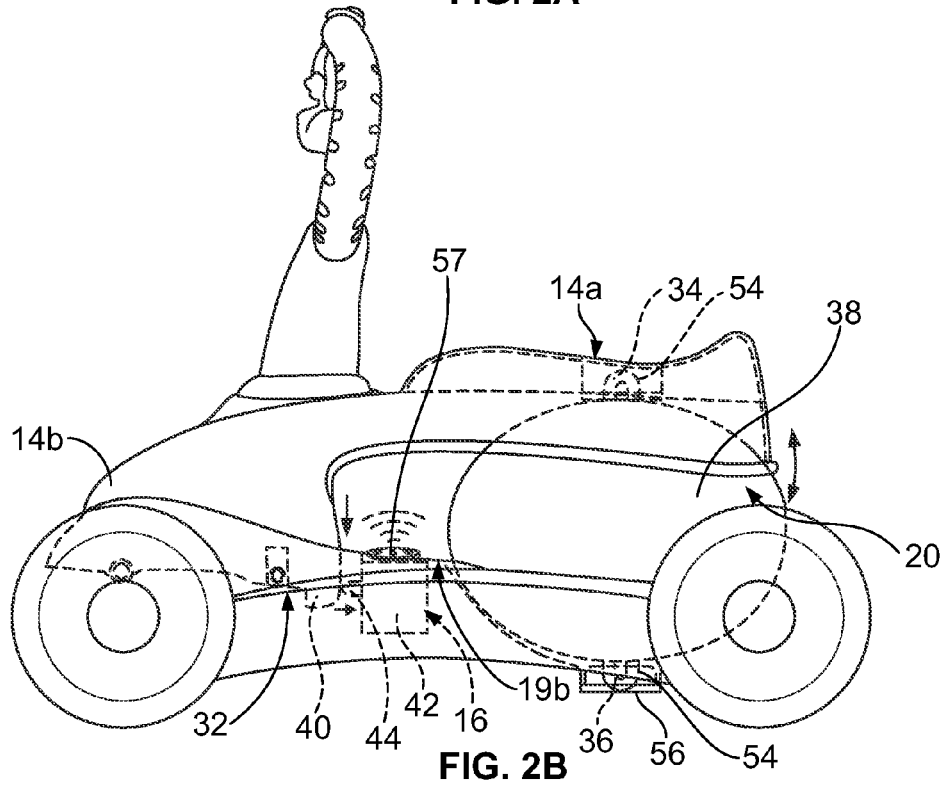
FIG. 2B illustrates the compression device depressed as the seat has moved to a second position, and further illustrating the seat engaging an actuating mechanism which is activating a sound effects unit.

The seat 14 is affixed to traverse between a first position, as seen in FIG. 2A, and a second position, as seen in FIG. 2B, at the frame 18. The seat 14 includes a ride on portion 14a to accommodate the user, and an attachment portion 14b opposite the ride on portion 14a to movably secure the seat 14 to the frame 18. In the present described embodiment, the seat 14 is generally seen as a single piece of molded heavy duty plastic including a molded ride on portion 14a elevated from the attachment portion with a textured surface providing comfort and interest at the portion where the user will sit. The molded plastic material of the seat 14 provides a strong and durable seat that can include several fun colors and is multi-functional yet inexpensive to manufacture.

The deformable compression device 20 is positioned at the seat 14 at the ride on portion 14a, as seen in FIGS. 2A & 2B. In the present described embodiment, the compression device 20 biases the seat to the first position and is securely attached to the ride on portion 14a at attachment point 34 and partially enveloped by the ride on portion 14a. Similarly, the compression device 20 rests on a surface 22a within the scooped out concave portion 22 of the frame 18 and is securely attachment to the frame at attachments point 36 which is generally opposite attachment point 34. The compression device 20 is held securely between the seat 14 and the frame 18 and is capable of depressing as the seat moves from the first position, as seen in FIG. 2A to the second position as seen in FIG. 2B.

In the present described embodiment, the compression device 20 is made of an elastomeric material biasing the seat 14 to the first position, as seen in FIG. 2A. The compression device 20 is strong and rigid enough to bias the seat to the first position and support the weight of the user on the seat, as seen in FIG. 2A, while at the same time the compression device 20 is deformable enough to depress when the seat is moved to the second position, as seen in FIG. 2B. The compression device 20 can be repeatedly depressed and returned back to the original biasing position, enabling a user to repeatedly bounce up and down on the seat and repeatedly activate the sound effects unit interactively.

Additionally, in the present described embodiment, the compression device includes an inflatable ball 38, as seen in FIGS. 1-2. The inflatable ball is secured to the seat 14 at attachment point 34 and secured to the frame 18 at attachment point 36 and can include fun colors, shapes and applied designs. The inflatable ball 38 can be easily inflated and deflated while still secured to attachment points 34 & 36 providing for easy collapsing and packaging of the ride on toy 12 without requiring the end user to assemble and attach the inflatable ball before using, and without compromising the attachment of the inflatable ball once it has left the manufacturer.

Additionally, the inflatable ball 38 can be removed from both attachment points 34 and 36 and replaced with a new inflatable ball or alternative compression device should the need arise. In the present described embodiment, an attachment mechanism 50, as seen in 4, is included at each attachment point 34 & 36, as seen in FIGS. 2A & 2B, and includes a securing member 52 which catches and holds a loop 54 of the inflatable ball 38. A plate 56, as seen in FIGS. 1 and 2B, covers the securing member 52 and secured loop 54 to prevent inadvertent releasing of the inflatable ball 38 from attachment points 34 and 36. The securing member 52 can be easily removed, releasing the loop 54 and freeing the inflatable ball from attachment points 34 and 36, and also easily returned securing to the frame and seat a new inflatable ball or alternative compression device should the need arise.

An actuating mechanism 32 is affixed at the seat 14 to mechanically engage and activate the sound effects unit 16 when the seat 14 is in the second position, as seen in FIG. 2B. In the present described embodiment, the actuating mechanism further includes a cam 40 secured at the seat for engaging and actuating the sound effects unit 16. The cam 40 is integral with the seat 14 generally positioned at the attachment portion 14b and is capable of passing at least partially through the cut out portion 24 of the frame 18 to actuate the sound effects unit 16 when the seat 14 is moved from the first position to the second position by a user. It is also contemplated that the cam 40 could be a separate element securely attached to the seat 14 rather that being integral.

In the present described embodiment, the cam 40 is molded with the seat 14 and is of the same heavy duty plastic material providing an inexpensively manufactured cam that includes the strength and integrity needed to repeatedly activate the sound effects unit. The cam 40 is positioned and capable of engaging and activating the sound effects unit 16 as a user repeatedly bounces on the combined seat 14 with compressions device 20 repeatedly moving the seat from the first position to the second position.

The sound effects unit 16, as seen in FIGS. 2A &2B, has a housing 42 which is secured to the frame 18. In the present described embodiment, the sound effects unit is secured to an underside surface 19b of the frame 18 opposite surface 19a upon which the actuating mechanism 16 passes through the cut out portion 24. The sound effects unit 16 includes a speaker 57 resting on surface 19a of the frame 18 positioned to projects sound toward the user.

Additionally, the sound effects unit 16 includes electronics contained within the housing 42 for generating a variety of pre-recorded sounds and music which are played interactively in response to the movement of the combined seat 14 and compression device 20. The pre-recorded sounds and music may alternate to different sounds and/or music each time the sound effects unit is actuated, or alternatively, the same sounds and/or music may repeat each time the sound effects unit is actuated. In the present described embodiment, the sound effects unit 16 includes a button switch 44 at the housing 42, as seen in FIGS. 2A & 2B, and the cam 40 engages and actuates the sound effects unit at the button switch 44. The button switch 44, also seen in FIG. 4, protrudes from the housing 42 along a plane generally parallel to surface 19b and is contacted and engaged by cam 40 depressing the button switch 44 into the housing 42 to actuate the sound effects unit.

In the present described embodiment, the sound effects unit includes two or more pre-recorded sound tracks. The actuating mechanism 32, which is affixed at the seat in mechanical communication with the sound effects unit as described above, activates the sound effects unit 16 interactively changing the pre-recorded sound tracks each time the seat is in the second position.

In use, the user, which is typically a young child, sits on the ride on portion 14a of the seat 14, which is biased to the first position by the inflatable ball 38, as seen in FIG. 2A As the user's weight and/or strength drives the seat from the first position to the second position, as seen in FIG. 2B, the inflatable ball 38 is depressed allowing the cam 40 to contact button switch 44 and activate the sound effects unit 16 to play pre-recorded sounds and music. As the user repeatedly bounces up and down on the seat 14, the inflatable ball repeatedly depresses and then recovers to the original biasing position allowing contact between the cam 40 and button switch 44 each time the seat is moved to the second position, and preventing contact between the cam 40 and button switch 44 each time the seat is moved to the first position, allowing the user to simply yet interactively actuate the sound effects device. In the present described embodiment, the user repeatedly changes the pre-recorded sound tracks of the sound effects unit 16 each time the seat 14 is in the second position as the user repeatedly bounces up and down on the seat.

Figure 4:
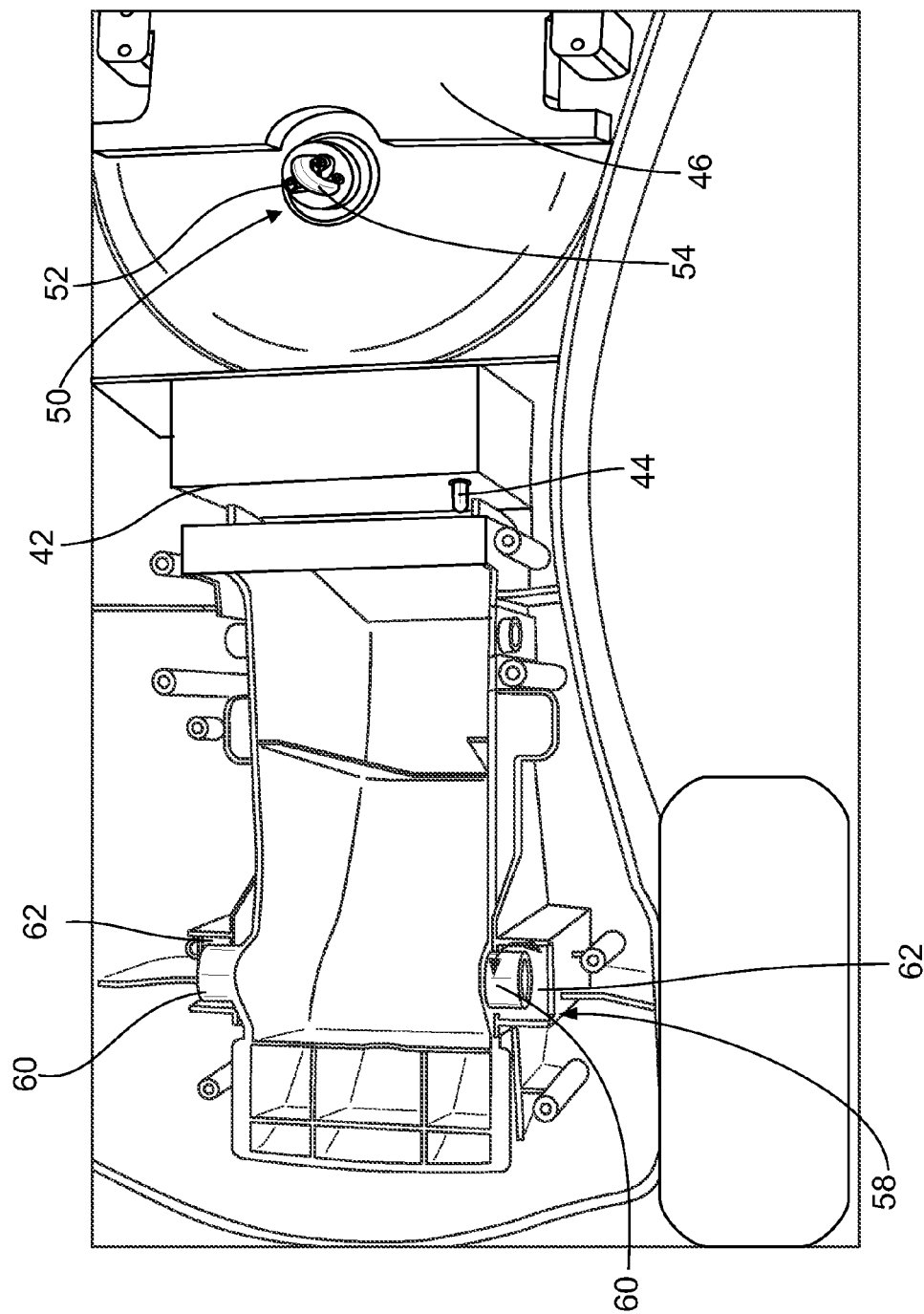
FIG. 4 illustrates a pivoting mechanism secured at the seat at an end opposite the compression device forming a pivoting attachment between the seat and the frame, and further illustrates an attachment mechanism.

In the present described embodiment, a pivot member 58 is secured to the seat 14 at an end opposite the compression device 20 forming a pivoting attachment between the seat and the frame. As seen in FIG. 4, the seat 14 includes one or more protrusions 60 at the attachment end 14b of the seat and in the present described embodiment a protrusion is positioned on either side of the seat at the attachment end 14b. The protrusions 60 are integral with the seat and molded of the same heavy duty plastic material providing an inexpensively manufactured protrusion that includes the strength and integrity needed to repeatedly pivot the seat. The protrusions 60 each rest in a curved indentation 62 in the frame 18. The curved indentations support the positioning of the protrusions while allowing the protrusions to pivot within the curved indentations 62, and further allowing the seat to pivot with respect to the frame.

Figure 3:
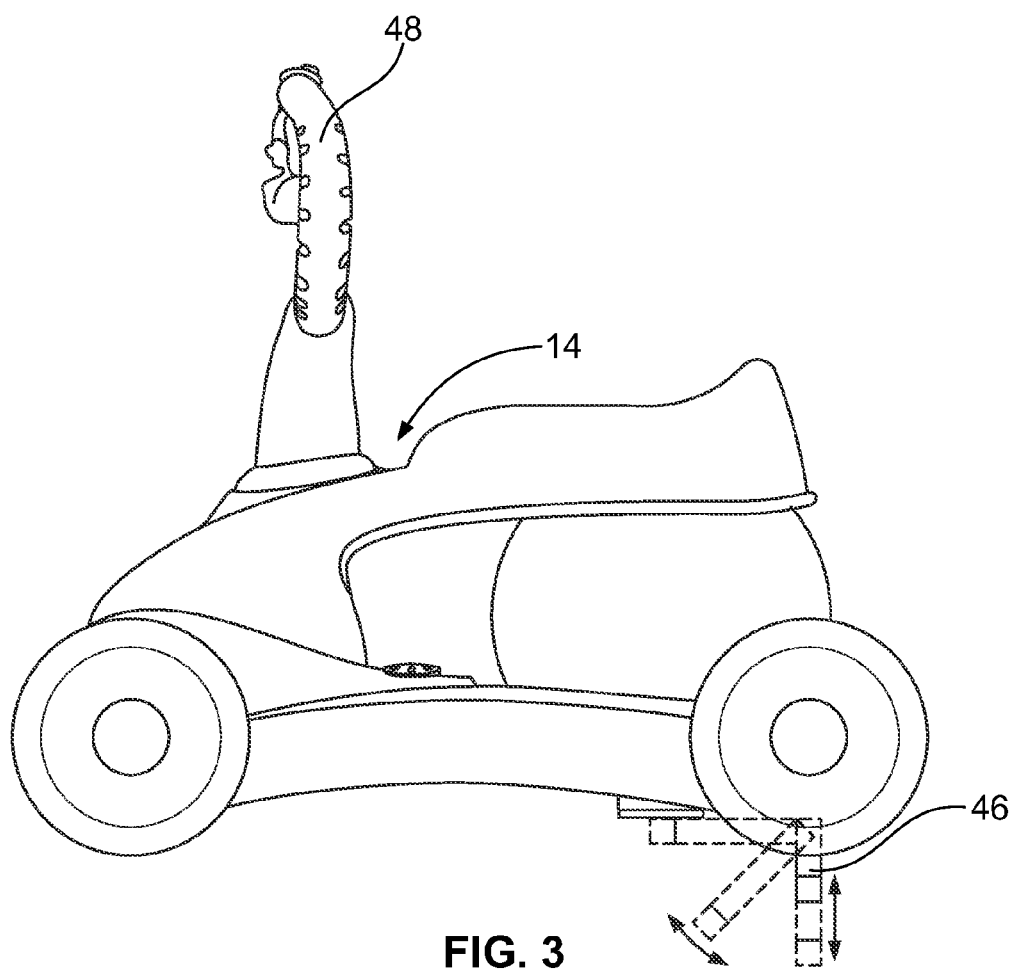
FIG. 3 illustrates a kick stand secured to the frame and capable of maintaining the toy in a stationary position when locked to an upright position resting on a surface and lifting rear wheels from the surface, as well as being capable of folding up to a contained position within the frame allowing the toy vehicle to roll along the surface.

In the present described embodiment, a kick stand 46, as seen in FIGS. 3 and 4, is secured to the frame 18 for maintaining the toy vehicle 12 in a stationary position on the surface. The kick stand 46, as seen in FIG. 3, can lock into an upright position, lifting the rear wheels off the ground to maintain the toy vehicle in a stationary position. As discussed above, the user can roll the toy vehicle along a surface. Alternatively, the kick and as seen in FIGS. 3 & 4 is capable of folding, as seen in FIG. 4, to a tucked position snapped under the frame and out of the way of the wheels 26, allowing the toy vehicle to freely roll along a surface. In either position, stationary or rolling, the user can interactively actuate the sound effects device 16, as described above, while bouncing up and down on the combined seat with compression device.

In the present described embodiment, a handle bar element 48, as seen in FIG. 3, is further included and secured to the seat 14 for a user to grip and hold while bouncing on the combined seat 14 with compression device 20 in either a stationary position or when rolling the toy vehicle 12 along the surface. The handle bar element 48 is securely attached to the seat positioned adjacent the ride on portion 14a and is molded from the same durable heavy duty plastic material as the seat and can include fun colors, shapes and applied designs and toys. It is also contemplated that the handle bar element 48 may be integral with the seat element and made of other materials such as wood or metal, etc.

A method for interactively engaging and actuating a sound effects unit in a ride on toy vehicle includes the steps of providing a frame for a ride on toy vehicle, providing a sound effects unit having a housing secured to the frame, providing a seat affixed to traverse between first and second positions at the frame, providing a deformable compression device biasing the seat to the first position, and providing an actuating mechanism affixed at the seat for engagement with the sound effects unit. Driving the seat from the first position to the second position depresses the compression device and interactively activating the sound effects unit when the seat is in the second position.

The method further includes the steps of providing the sound effects unit with two or more pre-recorded sound tracks and further including the steps of repeatedly driving the seat to the second position depressing the compression device and restoring the compression device to the biasing position to interactively change the pre-recorded sound tracks each time the seat is in the second position.

The method further includes the compression device having an elastomeric material for supporting the seat in the first position and depressing to allow the seat to be moved into the second position enabling a user to repeatedly bounce up and down on the seat. The method further includes the compression device including an inflatable ball.

The method further includes the steps of the actuating mechanism further providing a cam secured to the seat for engaging and actuating the sound effects unit, and the sound effects unit further providing a button switch at the housing and the cam engaging and actuating the sound effects unit at the button switch.

From the foregoing, it can be seen that there has been provided a unique combined seat with compression device for a ride on toy vehicle for simply yet interactively actuating an incorporated sound effects unit when a user bounces up and down on the combined seat with compression device. While a particular embodiment of the present invention has been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A toy, comprising:
   a frame for a ride-on toy vehicle;
   a sound effects unit having a housing secured to the frame;
   a seat affixed to traverse between first and second positions at the frame;
   a deformable compression device biasing the seat to the first position and depressing as the seat is moved from the first the position to the second position; and
   an actuating mechanism affixed at the seat to mechanically engage and activate the sound effects unit when the seat is in the second position.

2. The toy according to claim 1, wherein the compression device is made of an elastomeric material for repeatedly depressing enabling a user to bounce up and down on the seat and repeatedly activate the sound effects unit.

3. The toy according to claim 2 wherein the compression device further includes an inflatable ball.

4. The toy according to claim 1, wherein the actuating mechanism further includes a cam secured at the seat for engaging and actuating the sound effects unit.

5. The toy according to claim 3, wherein the sound effects unit further includes a button switch at the housing and the cam engages and actuates the sound effects unit at the button switch.

6. The toy according to claim 1, further comprising a pivot mechanism secured at the seat at an end opposite the compression device forming a pivoting attachment between the seat and the frame.

7. The toy according to claim 1, further comprising one or more wheels rotatably secured to the frame.

8. The toy according to claim 7, further comprising a kick stand secured to the frame for maintaining the toy in a stationary position.

9. The toy according to claim 1, further comprising a handle bar element.

10. A method for interactively engaging and actuating a sound effects unit in a ride on toy vehicle, comprising the steps of:
providing a frame for a ride on toy vehicle;
providing a sound effects unit having a housing secured to the frame;
providing a seat affixed to traverse between first and second positions at the frame;
providing a deformable compression device biasing the seat to the first position;
providing an actuating mechanism affixed at the seat for engagement with the sound effects unit; and
driving the seat from the first position to the second position depressing the compression device and interactively activating the sound effects unit when the seat is in the second position.

11. The method according to claim 10, wherein the sound effects unit further includes two or more pre-recorded sound tracks and further including the steps of repeatedly driving the seat to the second position depressing the compression device, and restoring the compression device to the biasing position to interactively change the pre-recorded sound tracks each time the seat is in the second position.

12. The method according to claim 10, wherein the compression device further provides an elastomeric material for supporting the seat in the first position and depressing to allow the seat to be moved into the second position enabling a user to repeatedly bounce up and down on the seat.

13. The method according to claim 12, wherein the compression device further includes an inflatable ball.

14. The method according to claim 10, wherein the actuating mechanism further provides a cam secured to the seat for engaging and actuating the sound effects unit.

15. The toy according to claim 13, wherein the sound effects unit further provides a button switch at the housing and the cam engages and actuates the sound effects unit at the button switch.

16. A toy, comprising:
a frame for a ride-on toy vehicle;
a sound effects unit having a housing secured to the frame and including two or more pre-recorded sound tracks;
a seat affixed to traverse between first and second positions at the frame;
a deformable compression device affixed to depress and bounce back at the seat, depressing when the seat is in the second position; and
an actuating mechanism affixed at the seat in mechanical communication with the sound effects unit activating the unit and interactively changing the pre-recorded sound tracks each time the seat is in the second position.

17. The toy according to claim 16, wherein the compression device further includes an elastomeric material for repeatedly depressing enabling a user to repeatedly bounce up and down on the seat and interactively activate the sound effects unit.

18. The toy according to claim 17, wherein the compression device further includes an inflatable ball.

19. The toy according to claim 16, wherein the actuating mechanism further includes a cam secured to the seat for engaging and actuating the sound effects unit.

20. The toy according to claim 19, wherein the sound effects unit further includes a button switch at the housing and the cam engages and actuates the sound effects unit at the button switch.

* * * * *